(12) United States Patent
Hadidi et al.

(10) Patent No.: US 9,643,891 B2
(45) Date of Patent: *May 9, 2017

(54) METHOD FOR MAKING AMORPHOUS PARTICLES USING A UNIFORM MELT-STATE IN A MICROWAVE GENERATED PLASMA TORCH

(71) Applicant: AMASTAN TECHNOLOGIES LLC, North Andover, MA (US)

(72) Inventors: Kamal Hadidi, Somerville, MA (US); Makhlouf Redjdal, Storrs-Mansfield, CT (US)

(73) Assignee: AMASTAN TECHNOLOGIES LLC, North Andover, MA (US)

( * ) Notice: Subject to any disclaimer, the term of this patent is extended or adjusted under 35 U.S.C. 154(b) by 13 days.

This patent is subject to a terminal disclaimer.

(21) Appl. No.: 14/597,877

(22) Filed: Jan. 15, 2015

(65) Prior Publication Data

US 2015/0126355 A1    May 7, 2015

Related U.S. Application Data

(63) Continuation of application No. 13/693,737, filed on Dec. 4, 2012, now Pat. No. 8,951,496.

(51) Int. Cl.
| | | |
|---|---|---|
| *C04B 35/00* | (2006.01) | |
| *C04B 35/505* | (2006.01) | |
| *C01B 21/064* | (2006.01) | |
| *C01B 31/36* | (2006.01) | |
| *C01F 5/06* | (2006.01) | |
| *C01F 17/00* | (2006.01) | |
| *C04B 35/44* | (2006.01) | |
| *C04B 35/443* | (2006.01) | |
| *C04B 35/563* | (2006.01) | |
| *C04B 35/583* | (2006.01) | |
| *C04B 35/626* | (2006.01) | |
| *H05H 1/30* | (2006.01) | |
| *C01B 21/06* | (2006.01) | |
| *C01F 7/16* | (2006.01) | |
| *C01B 21/082* | (2006.01) | |
| *C01F 7/30* | (2006.01) | |
| *C04B 35/622* | (2006.01) | |

(52) U.S. Cl.
CPC .......... *C04B 35/505* (2013.01); *C01B 21/064* (2013.01); *C01B 21/0605* (2013.01); *C01B 21/0646* (2013.01); *C01B 21/0828* (2013.01); *C01B 31/36* (2013.01); *C01F 5/06* (2013.01); *C01F 7/162* (2013.01); *C01F 7/30* (2013.01); *C01F 17/0025* (2013.01); *C01F 17/0043* (2013.01); *C04B 35/44* (2013.01); *C04B 35/443* (2013.01); *C04B 35/563* (2013.01); *C04B 35/583* (2013.01); *C04B 35/622* (2013.01); *C04B 35/62665* (2013.01); *H05H 1/30* (2013.01); *C01P 2002/02* (2013.01); *C04B 2235/3206* (2013.01); *C04B 2235/3217* (2013.01); *C04B 2235/3222* (2013.01); *C04B 2235/3225* (2013.01); *C04B 2235/443* (2013.01); *C04B 2235/5436* (2013.01); *C04B 2235/5481* (2013.01)

(58) Field of Classification Search
CPC . C04B 35/505; C04B 35/622; C01B 21/0646; C01B 21/0828; C01B 21/0605; C01B 31/36; C01F 5/06; C01F 7/30; C01F 7/162; C01F 17/0025; C01F 17/0043
USPC .... 423/600, 625, 592.1, 290, 291, 276, 384, 423/636, 263
See application file for complete search history.

(56) References Cited

U.S. PATENT DOCUMENTS

| | | |
|---|---|---|
| 5,958,361 A | 9/1999 | Laine et al. |
| 6,274,110 B1 | 8/2001 | Kim et al. |
| 6,543,380 B1 | 4/2003 | Sung-Spitzl |
| 6,652,822 B2 | 11/2003 | Phillips et al. |
| 6,902,745 B2 | 6/2005 | Lee et al. |
| 6,919,527 B2 | 7/2005 | Boulos et al. |
| 7,182,929 B1 | 2/2007 | Singhal et al. |
| 7,220,398 B2 | 5/2007 | Sutorik et al. |
| 7,357,910 B2 | 4/2008 | Phillips et al. |
| 7,629,553 B2 * | 12/2009 | Fanson .................. B01J 23/002 219/121.38 |
| 7,700,152 B2 | 4/2010 | Laine et al. |
| 8,211,388 B2 | 7/2012 | Woodfield et al. |
| 8,268,230 B2 | 9/2012 | Cherepy et al. |

(Continued)

OTHER PUBLICATIONS

Boulos, M.I., The inductively coupled radio frequency plasma. J.High Temp. Mater. Process, vol. I, pp. 17-39 (1997).
International Preliminary Report on Patentability issued in Application No. PCT/US2014/030965, mailed Oct. 1, 2015.
International Search Report issued in Application No. PCT/US2014/030965, dated Aug. 18, 2014.
Laine, R.M. et al., Making nanosized oxide powders from precursors by flamre spray pyrolysis. Key Engineering Materials, vol. 159-160, pp. 17-24 (1999).

(Continued)

*Primary Examiner* — Steven Bos
(74) *Attorney, Agent, or Firm* — McCarter & English, LLP; Deborah M. Vernon; Heath T. Misley

(57) ABSTRACT

Feed material comprising uniform solution precursor droplets is processed in a uniform melt state using microwave generated plasma. The plasma torch employed is capable of generating laminar gas flows and providing a uniform temperature profile within the plasma. Plasma exhaust products are quenched at high rates to yield amorphous products. Products of this process include spherical, highly porous and amorphous oxide ceramic particles such as magnesia-yttria (MgO—$Y_2O_3$). The present invention can also be used to produce amorphous non oxide ceramic particles comprised of Boron, Carbon, and Nitrogen which can be subsequently consolidated into super hard materials.

13 Claims, 4 Drawing Sheets

(56) References Cited

U.S. PATENT DOCUMENTS

| | | | |
|---|---|---|---|
| 8,329,090 | B2 | 12/2012 | Hollingsworth et al. |
| 8,951,496 | B2 * | 2/2015 | Hadidi ................. C01B 21/064 |
| | | | 423/263 |
| 9,023,259 | B2 * | 5/2015 | Hadidi ..................... B29B 9/16 |
| | | | 264/10 |
| 9,242,224 | B2 * | 1/2016 | Redjdal ................. B01J 19/126 |
| 2002/0112794 | A1 | 8/2002 | Sethuram et al. |
| 2004/0009118 | A1 | 1/2004 | Phillips et al. |
| 2004/0183008 | A1 | 9/2004 | Wiseman |
| 2005/0025698 | A1 | 2/2005 | Talbot et al. |
| 2006/0145124 | A1 | 7/2006 | Hsiao et al. |
| 2007/0075052 | A1 * | 4/2007 | Fanson ................. B01J 23/002 |
| | | | 219/121.52 |
| 2008/0173641 | A1 | 7/2008 | Hadidi et al. |
| 2009/0074655 | A1 | 3/2009 | Suciu |
| 2010/0200808 | A1 | 8/2010 | Hafiz et al. |
| 2012/0322645 | A1 | 12/2012 | Jordan et al. |

OTHER PUBLICATIONS

Muoto, C.K., Jordan, E.H., Gell, M. Aindow, M. and Cinibulk, M., Phase Homogeneity in Y2O3—MgO Nanocomposites Synthesized by Thermal Decomposition of Nitrate Precursors with Ammonium Acetate Additions, J. Am. Ceram. Soc., 94: 4207-4217 (2011).

Office Action issued in U.S. Appl. No. 14/208,955, mailed May 7, 2015.

Veith et al., Low temperature synthesis of nanocrystalline Y3Al5O12 (YAG) and Ce-doped Y3Al5O12 via different sol-gel methods. J. Mater. Chem., 9: 3069-3079 (1999).

Written Opinion issued in Application No. PCT/US2014/030965, dated Aug. 18, 2014.

\* cited by examiner

FIG. 2a
FIG. 2b
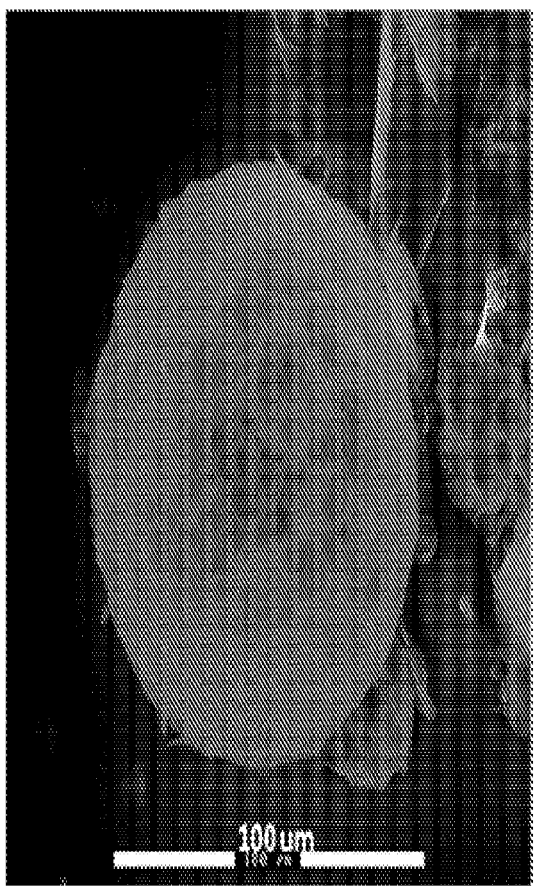
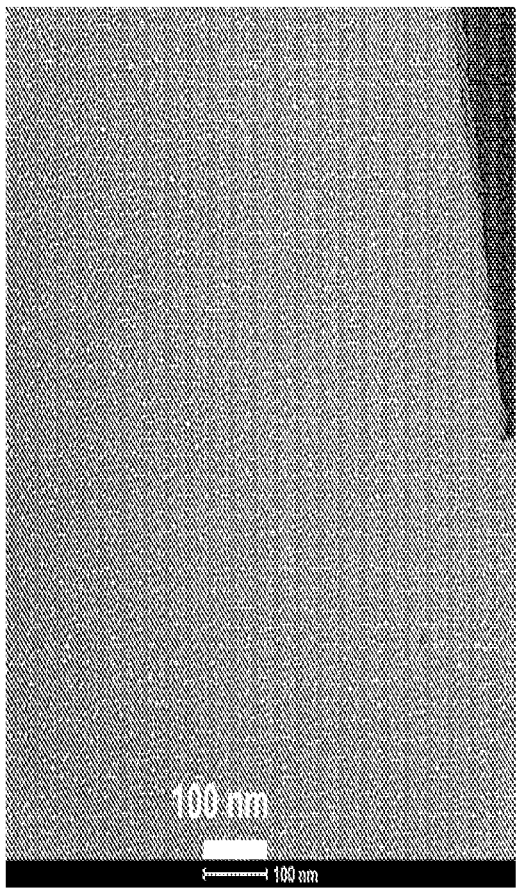

METHOD FOR MAKING AMORPHOUS PARTICLES USING A UNIFORM MELT-STATE IN A MICROWAVE GENERATED PLASMA TORCH

CROSS-REFERENCE TO RELATED APPLICATIONS

This application is a continuation of U.S. patent application Ser. No. 13/693,737, filed Dec. 4, 2012, which is incorporated herein by reference in its entirety.

TECHNICAL FIELD

The present invention is generally directed to a method for making amorphous ceramic powders from uniform solution precursor droplets comprised of ceramic feedstock. More particularly, the present invention is directed to a method that uses a microwave plasma torch capable of providing a uniform melt-state process by generating laminar gas flows and a uniform temperature profile within the plasma. In addition, the torch is capable of producing high heating and quenching rates under air or inert gas conditions. Even more particularly, in a preferred embodiment of the present invention, a droplet maker is used as a materials feeder to inject uniform solution precursor droplets into the plasma torch. This process has been particularly used to produce amorphous magnesia-yttria ($MgO$—$Y_2O_3$) nanocomposite particles that are uniform in size, spherical, and highly porous. In addition, the process can be used to produce non oxide amorphous ceramics comprised of Boron, Carbon and Nitrogen that can be subsequently consolidated into super hard materials.

BACKGROUND OF THE INVENTION

An amorphous solid is a solid that does not exhibit the long-range order characteristics of a crystal and as a result has no crystalline structure in the solid phase. A nanocomposite crystalline solid with very small grain size can also be categorized as amorphous as long as the grain size is in the order of a couple of nanometers. In the early 1960's, there was extensive interest in the development of amorphous magnetic materials, such as Permalloy, to lower the energy loss in transformers and energy generation. Recently, the interest has shifted toward nanocomposite materials which exhibit a certain level of crystallinity without achieving the amorphous content of materials such as glass. This shift in interest has led to materials with superior properties and consequently to new fields of application.

The non-homogeneity of feedstock, whether it is solid or liquid, and the non-uniform thermal path during material processing have been two key problems when producing homogeneous and amorphous materials. Nanocerox, Inc. produced magnesia-yttria nanocomposites suitable in the fabrication of domes. These nanocomposites are not amorphously produced and are used in the infrared transmission after consolidation. Nanocerox powders are produced using a flame pyrolysis method, described in U.S. Pat. No. 5,958, 361, which uses a relatively low temperature not exceeding 1500° C. while conventional plasma processes can reach temperatures well above a couple of thousand degrees Celsius. The initial non-homogeneity in the molecular composition of the solids is exacerbated because of the non-uniform thermal paths found in most conventional plasma spray processes, such as arc-plasma processes. These non-uniform thermal paths are due to the non-uniform temperature profiles found across the plasma plume. Even when using solution precursors, which have the advantage of uniformity in the initial material composition, subsequent thermal treatment remains an issue, because of the side-injection of solutes for example, which inherently subjects the processed material to non-uniform thermal paths. This leads to non-homogeneity and non-amorphous products or coatings.

The present invention solves the issue of composition non-homogeneity of feedstock and non-uniform thermal paths by creating a uniform melt state using the microwave plasma spray process. This uniform melt state is achieved by combining several key elements which include: axial injection, uniform solution precursor droplets with droplet diameter range variations no greater than 5% and a uniform plasma temperature profile in an axis-symmetric thermal processing environment. This uniform melt state process is characterized by high heating rates followed by high quenching rates. This leads to homogenous thermal processing along a uniform thermal path of the uniform composition of materials which results in homogenous and amorphous powder materials.

Thus there is a need to produce homogenous and amorphous powders using a plasma processing method which can provide a uniform high temperature thermal path for all the feed materials processed. However, no such method has been reported.

From the above, it is therefore seen that there exists a need in the art to overcome the deficiencies and limitations described herein and above.

SUMMARY OF THE INVENTION

The shortcomings of the prior art are overcome and additional advantages are provided through the use of a microwave generated plasma torch apparatus that is capable of generating laminar gas flows to produce amorphous ceramic powders from uniform solution precursor droplets.

In accordance with one embodiment of the present invention a droplet maker is used to axially inject uniform solution precursor droplets into the plasma torch. The precursor droplets are entrained in a laminar gas flow pattern and are processed in a uniform melt-state by being exposed to a uniform temperature profile within the microwave generated plasma, followed by high quenching rates in air or inert gas conditions. This results in products that are amorphous in nature.

Another feature of this invention is that it uses microwave generated plasma in accordance with U.S. patent application Ser. No. 13/445,947.

Therefore, an object of the present invention is to provide a laminar flow environment, free of turbulent flow effects, for the uniform solution precursor droplet feed that is processed using a microwave generated plasma, resulting in homogenous amorphous powders.

It is another object of the present invention to enhance plasma processing of materials so as to provide a product with improved thermal properties, improved corrosion and wear resistance and a higher tolerance to interface stresses.

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 2a shows a picture of an amorphous MgO—$Y_2O_3$ processed ceramic particle as seen through a scanning electron microscope.

FIG. 2b shows a transmission electron microscope picture of a small grain structure of a platelet from that particle.

DETAILED DESCRIPTION

Figure 1:
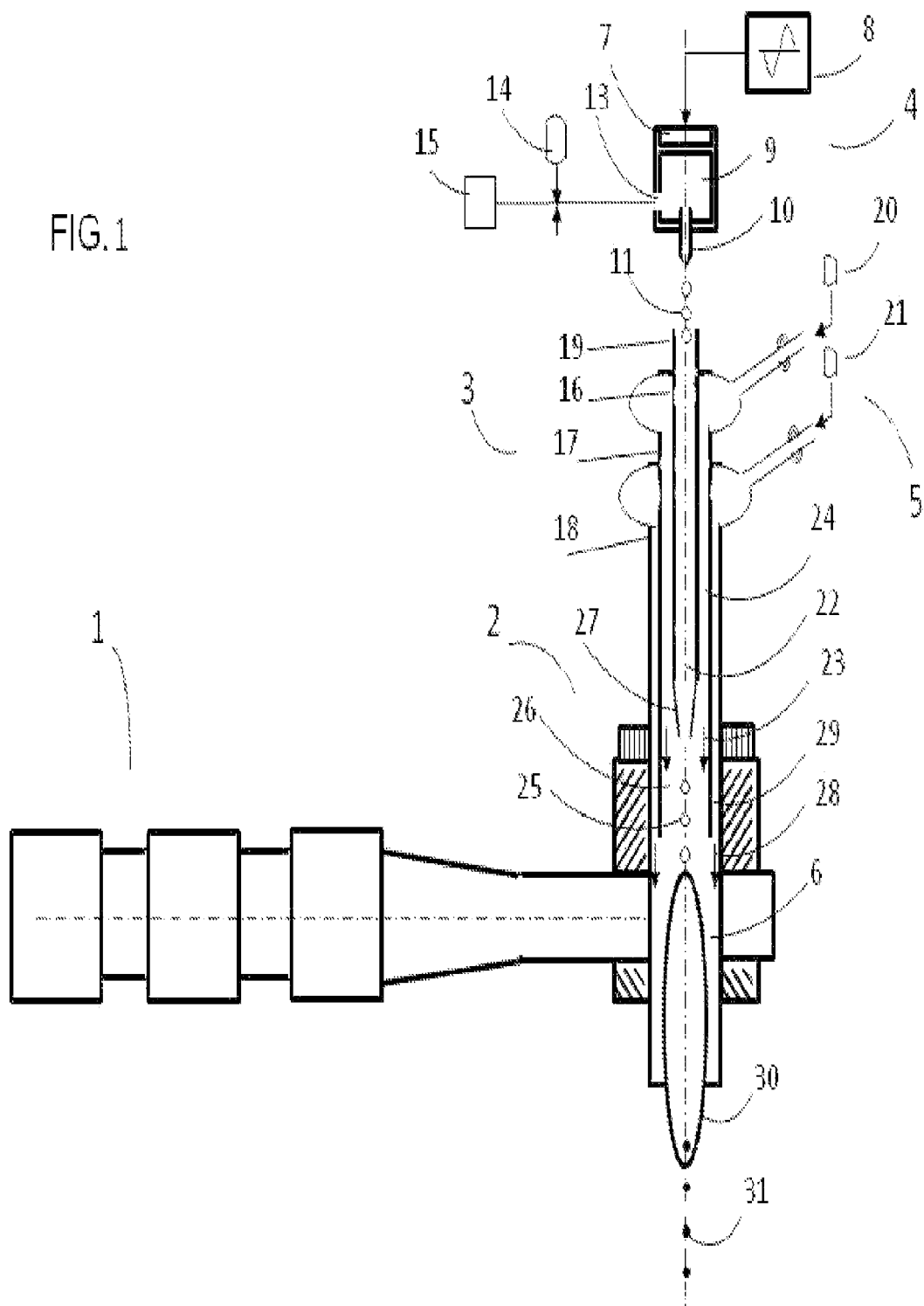
FIG. 1 illustrates the apparatus used for making amorphous ceramics powder, such as MgO—$Y_2O_3$, using a microwave plasma embodiment containing a microwave generating source as described in U.S. Patent Application No. 2008/0173641, a dielectric plasma torch as described in U.S. patent application Ser. No. 13/445,947, and a droplet maker dispensing precursor droplets, in accordance with the present invention.

The plasma torch apparatus 3 includes three concentric staggered dielectric tubes 16, 17, and 18, fused together to provide input 19 for uniform droplet 11 injection, and inputs 20 and 21 for process gas flows. Input 19 into tube 16 is used to inject uniform droplets 11, along alignment axis 22, using droplet maker 4. Input 20 is a pressurized source that provides a core laminar flow 23 through narrow annular gap 24, accelerating process particles 25 in region 26. Turbulence in flow 23 is minimized through tapering 27 at the end of tube 16. The length of region 26 is at least 1 inch, and can be 2 inches or longer, and has to be long enough so that process particles 25 reach a high velocity upon entering hot zone 6. Input 21 is a pressurized source that provides a second laminar flow 28 through a narrow gap 29, creating a laminar gas shroud at the exit of 29 between tube 17 and tube 18, which envelops plasma plume 30 and protects the inner wall of dielectric tube 18 from plasma attachment. Process particles 25 are guided along axis 22 by laminar flows 23 and 28 towards plasma plume 30 were they undergo homogeneous thermal treatment to become spherical product particles 31.

Referring to FIG. 1, illustrating an apparatus used in preparing amorphous materials, such as magnesia-yttria, which includes a microwave radiation generator 1, a plasma chamber 2, a dielectric plasma torch 3, a droplet maker 4, and a gas flow communication scheme 5. The microwave generator 1, described in U.S. Patent Application No. 2008/0173641, is combined with plasma chamber 2 and dielectric plasma torch 3, both 2 and 3 described in U.S. patent application Ser. No. 13/445,947, to ignite a stable plasma in hot zone 6 inside dielectric plasma torch 3. As an example of droplet makers, the droplet injection apparatus consists of the droplet maker 4 comprised of an internal piezo transducer 7 driven by an operational amplifier circuit 8, a precursor reservoir 9, and a nozzle capillary 10. A stream of uniform droplets 11 are produced using the Rayleigh breakdown law when transducer 7 is activated by circuit 8, while reservoir 9 is maintained full by injecting solution precursor through fitting 13 via peristaltic pump 14 from solution precursor dispensing source 15. A pressurized tank can be used in lieu of a peristaltic pump and solution source.

As an example, to synthesize nanocomposite powder particles such as magnesia-yttria, $M_gO$—$Y_2O_3$, this invention uses feedstock comprised of a solution precursor of magnesium and yttrium nitrates, mixed with acetic acid and ethylene glycol. The precursor is thoroughly mixed using a magnetic stirrer for at least half an hour to one hour to insure thorough molecular mixing of the composition. The precursor is then injected as uniform droplets, from 5 to 100 micrometers in diameter, or larger, produced by a uniform droplet making device. Injection flow rates are between 1 and 5 milliliters per minute (ml/min). On a low power microwave system, gas flows not exceeding a total of 80 standard cubic feet per hour for a stable plasma, entrain the particles through the hot zone and sheathe the inner wall of the dielectric plasma torch. With these laminar flows, the residence time inside the hot zone is approximately few milliseconds which leads to heating rates in the order of $10^6$ degrees Kelvin per second (K/s) as the temperature of the particle rises from ambient temperature to 6000 K upon entering the microwave plasma. Similarly, the quenching rates for quenching the plasma exhaust gas of the microwave generated plasma are in the same order of magnitude of $10^6$ K/s as the melted particles exit the plasma into ambient air or argon atmosphere. Higher flows are used when the power is increased to 50 kilowatts (KW), or higher, i.e., 100 KW. The $M_gO$—$Y_2O_3$ amorphous composite powder particles are collected using ceramic or stainless steel filters encased in an apparatus which is inserted in the path of the dust collection and heat evacuation system. The microstructure, size, and morphology of particle products are investigated using Scanning Electron Microscopy (SEM), Transmission Electron Microscopy (TEM), and X-ray Diffraction (XRD) techniques.

The plasma torch apparatus 3 includes three concentric staggered dielectric tubes 16, 17, and 18, fused together to provide input 19 for droplet 11 injection, and inputs 20 and 21 for process gas flows. Input 19 into tube 16 is used to inject process particles 11, along alignment axis 22, using injection apparatus 40. Input 20 is a pressurized source that provides a core laminar flow 23 through narrow annular gap 24, accelerating process particles 25 at the exit of tube 16, with laminar entrainment taking place in region 26 of tube 17. The width of gap 24 is chosen for high entrainment velocity of accelerated process particle 25 in region 26. Turbulence in flow 23 is minimized through tapering 27 at the end of tube 16. The length of region 26 is at least 1 inch, and can be 2 inches or longer, and has to be long enough so that particles 25 reach a high velocity upon entering hot zone 6. Input 21 is a pressurized source that provides a second laminar flow 28 through a narrow gap 29, creating a laminar gas shroud at the exit of 29 between tube 17 and tube 18, which envelops plasma plume 30 and protects the inner wall of dielectric tube 18 from plasma attachment. Droplets 25 are guided along axis 22 by laminar flows 23 and 28 towards microwave plasma 30 were they undergo homogeneous thermal treatment to become spherical product particles 31.

Figures 3A, 3B:
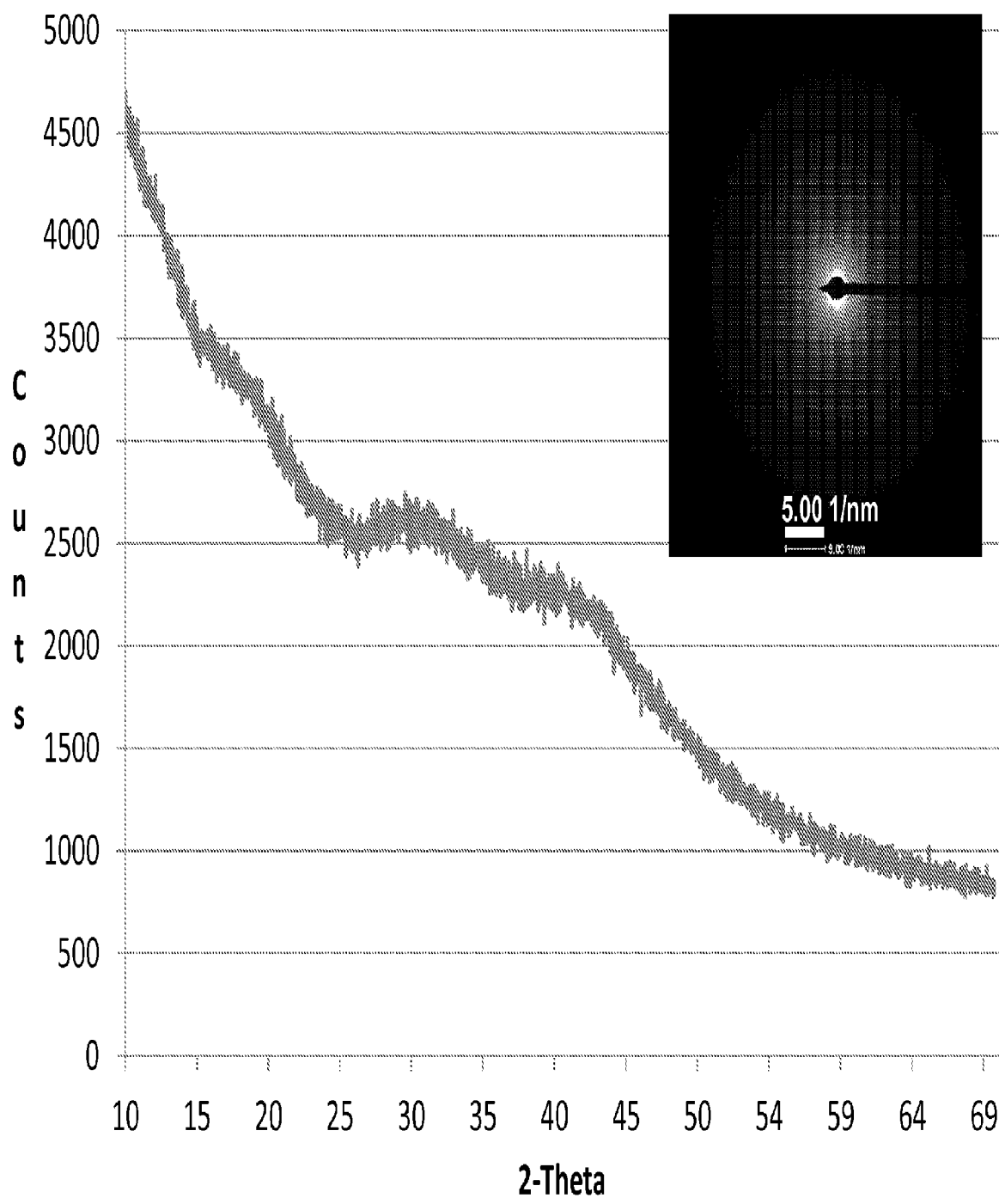
FIG. 3a shows an X-Ray Diffraction (XRD) plot of a representative volume of (MgO—$Y_2O_3$) ceramic particles.
FIG. 3b shows the corresponding Selected-Area-Diffraction-Pattern (SADP) spot of a representative volume of (MgO—$Y_2O_3$) ceramic particles with only amorphous diffraction which reveals an absence of any crystalline structure and demonstrates the complete amorphousness of the processed product.

Referring to FIG. 3, a detailed analysis of the internal microstructure of the MgO—Y$_2$O$_3$ particle using XRD is shown. The M$_g$O—Y$_2$O$_3$ particle was referred to as 31 in FIG. 1. FIG. 3a shows the absence of any sharp peaks, which implies a total absence of the crystalline phases in particle product 31. FIG. 3b shows a diffuse Selected Area Diffraction Pattern (SADP) of the powder particles with only amorphous diffraction which confirms that no crystallization has occurred following microwave plasma processing. Both these results confirm the total amorphousness of the powder product processed using the thermal process described in FIG. 1.

To synthesize compound or composite amorphous powder particles, this invention uses feedstock comprised of solution precursors of nitrates, acetates, alkoxides, or organometallic precursors. The precursor is thoroughly mixed to ensure molecular mixing of the compounds. It is then injected in the form of uniform droplets into the uniform melt state process of the microwave plasma torch to obtain amorphous powder particles. Such amorphous powder products include for instance ceramic oxides such as magnesium oxide (MgO), aluminum oxide (Al$_2$O$_3$), yttrium oxide (Y$_2$O$_3$), magnesia-yttria nanocomposite (MgO—Y$_2$O$_3$), or a composition of Y$_2$O$_3$ and Al$_2$O$_3$ compounds for yttrium-aluminum oxide (YAG, Y$_3$Al$_5$O$_{12}$), or a composition of MgO and Al$_2$O$_3$ compounds for magnesium-aluminum oxide (MgAl$_2$O$_4$). These products and many others are produced by the simple choice of corresponding precursor solutions.

As an example, to synthesize nanocomposite powder particles such as magnesia-yttria, MgO—Y$_2$O$_3$, this invention uses feedstock comprised of a solution precursor of magnesium and yttrium nitrates, mixed with acetic acid and ethylene glycol. The precursor is thoroughly mixed using a magnetic stirrer for at least half an hour to one hour to insure thorough molecular mixing of the composition. The precursor is then injected as uniform droplets, from 5 to 100 micrometers in diameter, or larger, produced by a uniform droplet making device. Injection flow rates are between 1 and 5 milliliters per minute (ml/min). On a low power microwave system, gas flows not exceeding a total of 80 standard cubic feet per hour for a stable plasma, entrain the particles through the hot zone and sheathe the inner wall of the dielectric plasma torch. With these laminar flows, the residence time inside the hot zone is approximately few milliseconds which leads to heating rates in the order of 10$^6$ degrees Kelvin per second (K/s) as the temperature of the particle rises from ambient temperature to 6000 K upon entering the microwave plasma. Similarly, the quenching rates are in the same order of magnitude of 10$^6$ K/s as the melted particles exit the plasma into ambient air or argon atmosphere. Higher flows are used when the power is increased to 50 kilowatts (KW), or higher, i.e., 100 KW. The MgO—Y$_2$O$_3$ amorphous composite powder particles are collected using ceramic or stainless steel filters encased in an apparatus which is inserted in the path of the dust collection and heat evacuation system. The microstructure, size, and morphology of particle products are investigated using Scanning Electron Microscopy (SEM), Transmission Electron Microscopy (TEM), and X-ray Diffraction (XRD) techniques.

Referring to FIG. 2, a detailed analysis of the morphology and structure of an amorphous MgO—Y$_2$O$_3$ particle is presented. The MgO—Y$_2$O$_3$ particle was referred to as 31 in FIG. 1. FIG. 2a is a SEM photograph which reveals a spherical, honeycomb-like, and highly porous magnesia-yttria particle 31 produced using the microwave plasma process of FIG. 1. The particle diameter is 100 micrometers on average. Particle diameters as low as 20 micrometers can be achieved. Smaller diameters can be achieved with smaller nozzle diameters. Shreds of a broken sphere, or platelets shown next to the complete particle in FIG. 2a, have been examined using TEM as shown in FIG. 2b. The TEM photograph reveals a microstructure with indistinguishable grains of MgO or Y$_2$O$_3$ at the 100 nanometer scale, with a grain size not exceeding 5 nanometers, or less.

Referring to FIG. 3, a detailed analysis of the internal microstructure of the MgO—Y$_2$O$_3$ particle using XRD is shown. The MgO—Y$_2$O$_3$ particle was referred to as 31 in FIG. 1. FIG. 3a shows the absence of any sharp picks, which implies a total absence of the crystalline phases in particle product 31. FIG. 3b shows a diffuse Selected Area Diffraction Pattern (SADP) of the powder particles with only amorphous diffraction which confirms that no crystallization has occurred following microwave plasma processing. Both these results confirm the total amorphousness of the powder product processed using the thermal process described in FIG. 1.

Figure 4:
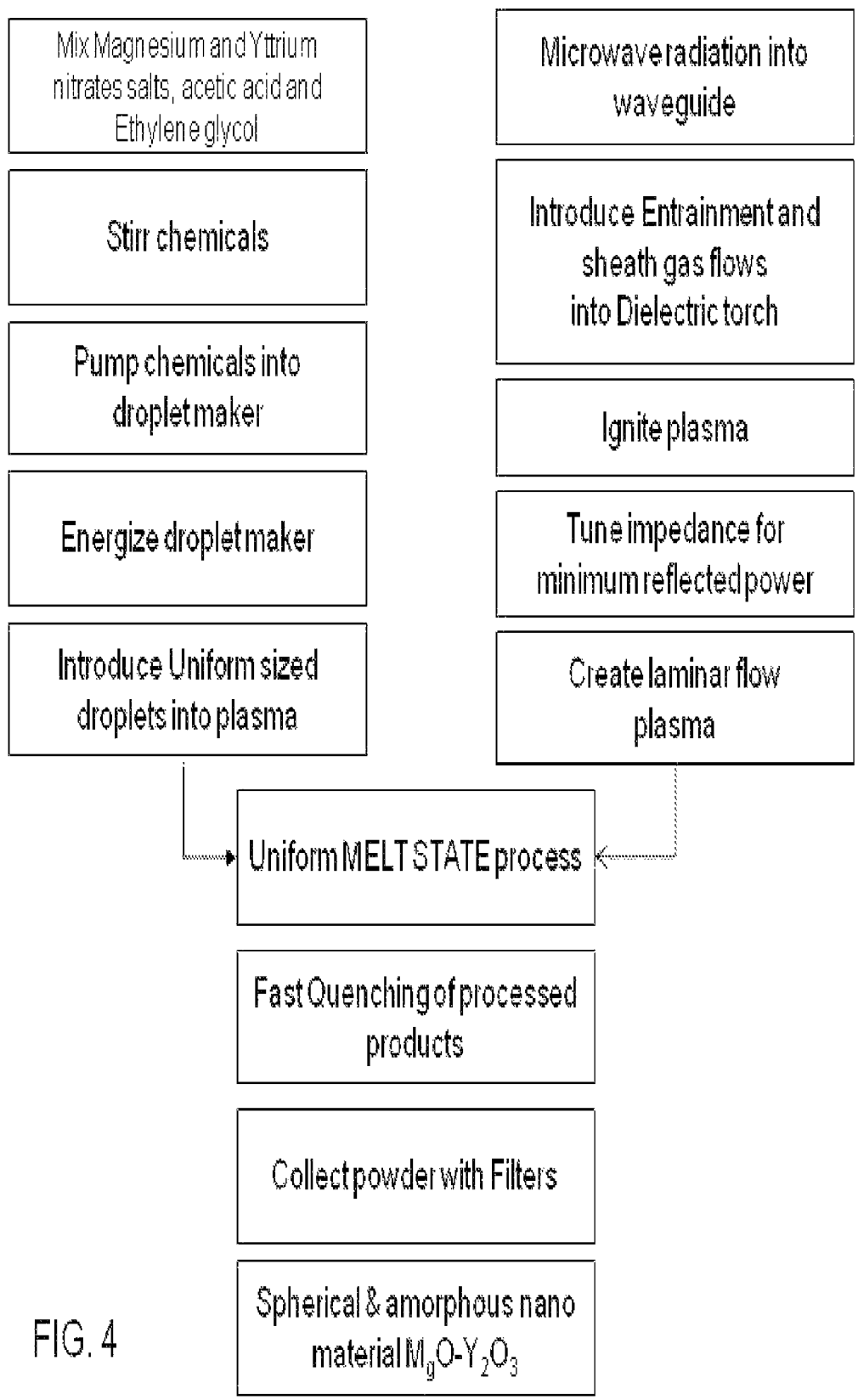
FIG. 4 describes a method for making amorphous powders, such as (MgO—$Y_2O_3$) as an example, by injecting a continuous stream of uniform droplets using a droplet maker.

Referring to FIG. 4, a description of the procedure for making amorphous MgO—Y$_2$O$_3$ particles from uniform solution droplets is provided. The desired chemical composition is first mixed in accordance with the desired concentrations for each compound. This method can be applied for other existing oxide ceramic materials using known stoichiometric ratios for producing composite materials such as yttrium-aluminum oxide (YAG, Y$_3$Al$_5$O$_{12}$), or magnesium-aluminum oxide (MgAl$_2$O$_4$). Furthermore, the present invention can be used to produce new materials with new compositions for energy storage, optics, and magnetics applications. The precursor composition of magnesium and yttrium nitrates is subsequently stirred thoroughly to yield a homogenous molecular mix of reactants. The solution is then pumped inside a reservoir of a droplet making device using a peristaltic pump, or a pressurized tank. Once the reservoir is full, a piezo transducer is activated using drive electronics to create a disturbance in the volume of the solution in the reservoir. The solution emerges through a capillary nozzle as a continuous stream of uniform droplets exiting at a constant speed for a given frequency of drive electronics. Special attention is provided to the nature of the droplets stream so that it is not in a burst mode, but instead it is in the form of a jet with uniform droplets. Prior to this, referring to the right side of FIG. 4, microwave radiation is introduced into the waveguide towards the plasma chamber where the dielectric plasma torch is perpendicularly located in relation to the waveguide. Two annular flows are subsequently introduced, one for entrainment of injected droplets and the other to protect the inner wall of the outer tube of the plasma torch from melting under the effect of high plasma heat. Once both flows are in place, the plasma is ignited inside the dielectric plasma torch. An adequate combination of entrainment and cooling flows are chosen to stabilize the plasma. In addition, these flows are chosen to allow for a smooth circulation of droplets towards the plasma and avoid any turbulence that could create recirculation and the back flow of droplets above the hot zone. Once the droplets reach the plasma now present in the hot zone, they are subjected to a uniform melt state characterized by a uniform axisymmetric thermal path with a uniform temperature profile of the plasma in the hot zone. The droplets are processed volumetrically and uniformly as all solvents are burnt off.

The processed particles exit into an atmospheric fast quenching chamber below the exit nozzle of the plasma torch. The quenching rate can be as high as $10^6$ K/s, which leads to amorphous products. The product particles are collected into ceramic or stainless steel filters, and analyzed for their microstructure and mechanical, optical, and thermal properties.

This method can also be used to produce amorphous powder particles using other materials, such as non-oxide ceramics, by injecting solution precursors containing compound sources of corresponding ceramics into the microwave plasma. However, for non oxide ceramics, the quenching is done into a chamber filled with an inert gas such as argon. For instance, the method can be applied to solution precursors with sources of boron and nitrogen to produce amorphous Boron Nitride (a-BN) which can subsequently be consolidated into super hard cubic Boron Nitride (c-BN). The method can also be extended to the production of amorphous powder particles whose composition include Boron (B), Carbon (C), and Nitrogen (N), commonly known as CBN compounds. The latter can subsequently be consolidated into super hard materials such as $C_3N_4$, BN, $BC_4$, $BC_2N$, etc.

What is claimed is:

1. A method of producing amorphous powder particles comprising:
    introducing a feed material as precursor droplets from a feed injection device into a microwave plasma torch;
    entraining said feed material using laminar flow towards a microwave generated plasma;
    exposing said feed material to the microwave generated plasma to form plasma exhaust gas;
    quenching the plasma exhaust gas of said microwave generated plasma at a rate in the same order of magnitude of $10^6$ K/s to form amorphous powder particle products;
    filtering the quenched plasma exhaust gas of said microwave generated plasma; and
    extracting amorphous powder particle products from said filtered plasma exhaust gas.

2. The method of claim 1, wherein the precursor droplets are produced from a gas atomization process.

3. The method of claim 2, wherein the gas atomization process uses a pressurized tank.

4. The method of claim 2, wherein the precursor droplets have a diameter less than 100 microns.

5. The method of claim 1, wherein the precursor droplets have a diameter between 1 and 300 micrometers and a size distribution not exceeding 5%.

6. The method of claim 5, wherein the amorphous powder products are collected using ceramic or stainless steel filters with pore diameters not exceeding the diameter of the amorphous powder particle products.

7. The method of claim 1, wherein the feed material is comprised of homogenous precursor solutions of nitrates, acetates, alkoxides, or organometallics.

8. The method of claim 1, wherein the plasma torch is axisymmetric.

9. The method of claim 1, wherein the quenching step is done in air, or under inert gas conditions or under oxidizing conditions.

10. The method of claim 1, wherein the amorphous powder particle products are spherical, dense or porous.

11. The method of claim 1, wherein the amorphous powder particle products are metal oxides or metal oxide composites.

12. The method of claim 1, wherein the amorphous powder particle products are non-oxide compounds with the chemical formula $C_3N_4$, BN, $B_4C$, or $BC_2N$.

13. The method of claim 11, wherein the metal oxides or metal oxide composites are selected from the group consisting of: MgO, $Y_2O_3$, $Al_2O_3$, MgO—$Y_2O_3$, $Y_3Al_5O_{12}$, and $MgAl_2O_4$.

* * * * *